US008362639B2

(12) United States Patent

Nagase

(10) Patent No.: US 8,362,639 B2

(45) Date of Patent: Jan. 29, 2013

(54) LIGHT EMITTING DIODE DRIVE DEVICE, ILLUMINATION DEVICE, IN-VEHICLE CABIN ILLUMINATION DEVICE, AND VEHICLE ILLUMINATION DEVICE

(75) Inventor: Haruo Nagase, Kitakatsuragi (JP)

(73) Assignee: Panasonic Corporation, Osaka (JP)

( * ) Notice: Subject to any disclaimer, the term of this patent is extended or adjusted under 35 U.S.C. 154(b) by 271 days.

(21) Appl. No.: 12/738,119

(22) PCT Filed: Sep. 26, 2008

(86) PCT No.: PCT/JP2008/067394

§ 371 (c)(1), (2), (4) Date: Apr. 15, 2010

(87) PCT Pub. No.: WO2009/054224

PCT Pub. Date: Apr. 30, 2009

(65) Prior Publication Data

US 2010/0225235 A1 Sep. 9, 2010

(30) Foreign Application Priority Data

Oct. 26, 2007 (JP) ................................ 2007-279684

(51) Int. Cl.
*B60L 1/14* (2006.01)

(52) U.S. Cl. ...................................... 307/10.8; 315/308

(58) Field of Classification Search .................... 315/77, 315/82, 308; 307/10.1, 10.8
See application file for complete search history.

(56) References Cited

U.S. PATENT DOCUMENTS

| | | | | |
|---|---|---|---|---|
| 6,847,169 | B2 * | 1/2005 | Ito et al. | 315/77 |
| 6,888,454 | B2 * | 5/2005 | Kurose | 340/514 |
| 7,244,036 | B2 * | 7/2007 | Murakami et al. | 362/20 |
| 7,259,522 | B2 * | 8/2007 | Toyota et al. | 315/224 |
| 7,479,743 | B2 * | 1/2009 | Namba et al. | 315/307 |
| 7,528,553 | B2 | 5/2009 | Ito et al. | |
| 7,556,404 | B2 | 7/2009 | Nawashiro et al. | |
| 7,635,952 | B2 * | 12/2009 | Takeda et al. | 315/80 |

(Continued)

FOREIGN PATENT DOCUMENTS

| | | |
|---|---|---|
| JP | 09-288456 | 11/1997 |
| JP | 2004-296782 | 10/2004 |

(Continued)

OTHER PUBLICATIONS

Japanese Office Action, mailed Apr. 24, 2012, in corresponding Japanese Patent Application No. 2007-279684.

(Continued)

*Primary Examiner* — Thuy Vinh Tran

(74) *Attorney, Agent, or Firm* — Greenblum & Bernstein, P.L.C.

(57) ABSTRACT

A light emitting diode drive device includes a drive circuit section that applies a direct-current voltage to a light source including a plurality of light emitting diodes connected in series to allow the light source to light up, a voltage detection circuit section that detects a voltage across the light source, and a malfunction determination circuit section that determines that the light emitting diode is short-circuited when the voltage detection circuit section detects a voltage drop and a potential between the voltage before being dropped and the voltage after being dropped is equal to or more than a predetermined threshold value. Thus, it is possible to detect a fact that a light emitting diode, which lights up, is short-circuited or is not short-circuited, with a simple circuit configuration.

15 Claims, 9 Drawing Sheets

U.S. PATENT DOCUMENTS

| | | | | |
|---|---|---|---|---|
| 7,636,037 | B2 * | 12/2009 | Ito et al. | 340/458 |
| 7,642,902 | B2 * | 1/2010 | Yukumatsu et al. | 340/438 |
| 7,675,245 | B2 * | 3/2010 | Szczeszynski et al. | 315/291 |
| 2004/0196049 | A1 | 10/2004 | Yano et al. | |
| 2006/0055341 | A1 | 3/2006 | Watanabe et al. | |
| 2007/0019409 | A1 | 1/2007 | Nawashiro et al. | |
| 2007/0170876 | A1 | 7/2007 | Ito et al. | |
| 2007/0205793 | A1 | 9/2007 | Wang | |
| 2010/0039581 | A1 | 2/2010 | Mishima et al. | |

FOREIGN PATENT DOCUMENTS

| | | |
|---|---|---|
| JP | 2004-309614 | 11/2004 |
| JP | 2004-342809 | 12/2004 |
| JP | 2006-210272 | 8/2006 |
| JP | 2006-210835 | 8/2006 |
| JP | 2007-35403 | 2/2007 |
| JP | 2007-059378 | 3/2007 |
| JP | 2007-182158 | 7/2007 |
| JP | 2007-200610 | 8/2007 |
| JP | 2007-235087 | 9/2007 |

OTHER PUBLICATIONS

Japanese Office Action, mailed Aug. 28, 2012, in corresponding Japanese Patent Application No. 2007-279684.

* cited by examiner

LIGHT EMITTING DIODE DRIVE DEVICE, ILLUMINATION DEVICE, IN-VEHICLE CABIN ILLUMINATION DEVICE, AND VEHICLE ILLUMINATION DEVICE

TECHNICAL FIELD

The present invention relates to a light emitting diode drive device, as well as an illumination device, an in-vehicle cabin illumination device and a vehicle illumination device each employing the light emitting diode drive device.

BACKGROUND ART

As compared with an incandescent bulb, a light emitting diode is long in service life and excellent in responsivity of light emission upon reception of electric power because of light emission principles thereof. Moreover, a light emitting diode can be used in a compact and stereoscopic manner, and therefore is less susceptible to restrictions regarding a shape as an illumination device. Further, a light emitting diode can readily realize light emission of various colors without filters or the like. Accordingly, there have been proposed various illumination devices each including such a light emitting diode serving as a light source and various light emitting diode drive devices for supplying electric power to the light emitting diode.

In recent years, particularly, a white light emitting diode has been put into practical use, and therefore uses of an illumination device including such a light emitting diode serving as a light source have been increased. In the field of vehicles, for example, a white light emitting diode is used for vehicle illumination devices such as an in-vehicle cabin illuminator, a headlight, an auxiliary lamp and a daytime running lamp.

A light emitting diode drive device for supplying electric power to a light emitting diode includes a drive circuit section that applies a predetermined direct-current voltage to a light source including a plurality of light emitting diodes connected in series in order to secure a quantity of light and allows the light source to light up. Examples of such a light emitting diode drive device include a device that controls a drive circuit section in a PWM manner in order to stably supply desired electric current or electric power to a light source, and a device that detects an electrical abnormality of a light emitting diode (e.g., refer to Patent Document 1, Patent Document 2).

In a light emitting diode drive device that allows light emission from a light source including a plurality of light emitting diodes connected in series, it is desirable to detect a short circuit of the light emitting diode which lights up.

As shown in FIG. 9, for example, there has been proposed a light emitting diode drive device having the following structure. That is, a drive circuit section 3 receives electric power from a power supply 8, converts the electric power into a predetermined direct-current voltage, and applies the direct-current voltage to a light source 2. The light source 2 includes a plurality of light emitting diodes 1, and a plurality of voltage detection circuit sections 4' each detect a voltage across the relevant light emitting diode 1. An abnormality detection circuit section 5' detects an abnormality of each light emitting diode 1, based on the voltage detected by the voltage detection circuit section 4'. Moreover, there has also been proposed a light emitting diode drive device having the following structure. That is, a plurality of light emitting diodes are divided into several sets, and an abnormality detection circuit section detects a voltage across each set.

The light emitting diode drive device including the abnormality detection circuit section described above can widely detect electrical abnormalities such as a short circuit and a break of the light emitting diode. However, the light emitting diode drive device needs to detect the voltage at each of the plurality of light emitting diodes. Consequently, the light emitting diode drive device requires the voltage detection circuit sections 4' which are equal in number to the plurality of light emitting diodes. This structure complicates a circuit configuration.

Patent Document 1: Japanese Unexamined Patent Publication No. Hei 9-288456

Patent Document 2: Japanese Unexamined Patent Publication No. 2006-210835

DISCLOSURE OF THE INVENTION

The present invention has been devised in view of the circumstances described above, and one object thereof is to provide a light emitting diode drive device for applying a direct-current voltage to a light source including a plurality of light emitting diodes connected in series to allow the light source to light up. This light emitting diode drive device can determine whether or not the light emitting diode, which lights up, is short-circuited with a simple circuit configuration as compared with a conventional light emitting diode drive device having circuitry for detecting voltages at a plurality of light emitting diodes. Moreover, this light emitting diode drive device can be manufactured with smaller manufacturing steps at lower manufacturing cost as compared with a conventional light emitting diode drive device including a plurality of voltage detection circuit sections. Another object of the present invention is to provide an illumination device, an in-vehicle cabin illumination device and a vehicle illumination device each employing the light emitting diode drive device.

Objects, features and advantages of the present invention will become more apparent from the following detailed description and the attached drawings.

BEST MODE FOR CARRYING OUT THE INVENTION

The following embodiments will exemplify a light emitting diode drive device for use in a headlight of a vehicle.

First Embodiment

A circuit configuration and operations of a light emitting diode drive device A according to the present embodiment will be described with reference to FIGS. 1 through 6.

Figure 1:
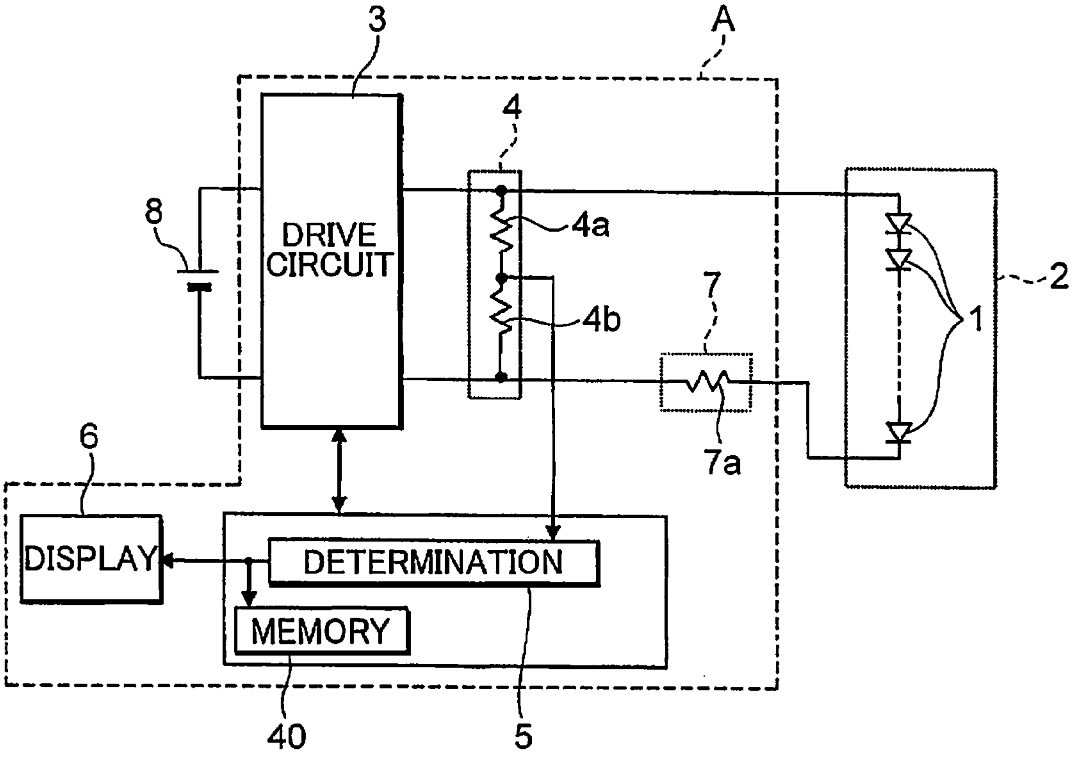
FIG. 1 shows a schematic circuit configuration of a light emitting diode drive device according to a first embodiment of the present invention.

First, the basic circuit configuration of the light emitting diode drive device A according to the present embodiment is described with reference to FIG. 1.

The light emitting diode drive device A according to the present embodiment includes a drive circuit section 3 that converts electric power supplied from a power supply 8 into a direct-current voltage and outputs the direct-current voltage, a voltage detection circuit section 4 that detects a voltage across a light source 2 including a plurality of light emitting diodes 1 connected in series, a malfunction determination circuit section 5 that determines whether or not the light emitting diode 1, which lights up, is short-circuited, based on the voltage detected by the voltage detection circuit section 4, a display section 6 that displays the result of determination by the malfunction determination circuit section 5, and a current detection circuit section 7 that detects an electric current to be fed to the light source 2.

In the present embodiment, the power supply 8 for supplying electric power to the light emitting diode drive device A is a battery that outputs a direct-current voltage. The power supply 8 has an output terminal connected with an input side of the drive circuit section 3. The drive circuit section 3 boosts the direct-current voltage output from the power supply 8, and outputs the boosted direct-current voltage through an output side thereof. The light source 2 is connected to the output side of the drive circuit section 3 and receives the boosted direct-current voltage, so that the plurality of light emitting diodes 1, which form the light source 2, each emit light. The voltage detection circuit section 4 includes voltage detection resistors 4*a* and 4*b* connected in series between two terminals of the light source 2. The voltage detection resistors 4*a* and 4*b* each divide the voltage across the light source 2 and output the divided voltage. This divided voltage is proportional to the voltage across the light source 2, and therefore allows detection of the voltage across the light source 2. The current detection circuit section 7 includes a current detection resistor 7*a*. The current detection resistor 7*a* outputs a voltage drop at the current detection resistor 7*a* in a form of signal voltage. This signal voltage is proportional to an electric current flowing through the light source 2, and therefore allows detection of the electric current flowing through the light source 2. The malfunction determination circuit section 5 determines whether or not the light emitting diode 1, which lights up, is short-circuited, based on the detected divided voltage. The display section 6 displays the fact that the light emitting diode 1 is short-circuited or is not short-circuited, which is determined by the malfunction determination circuit section 5.

Figure 2:
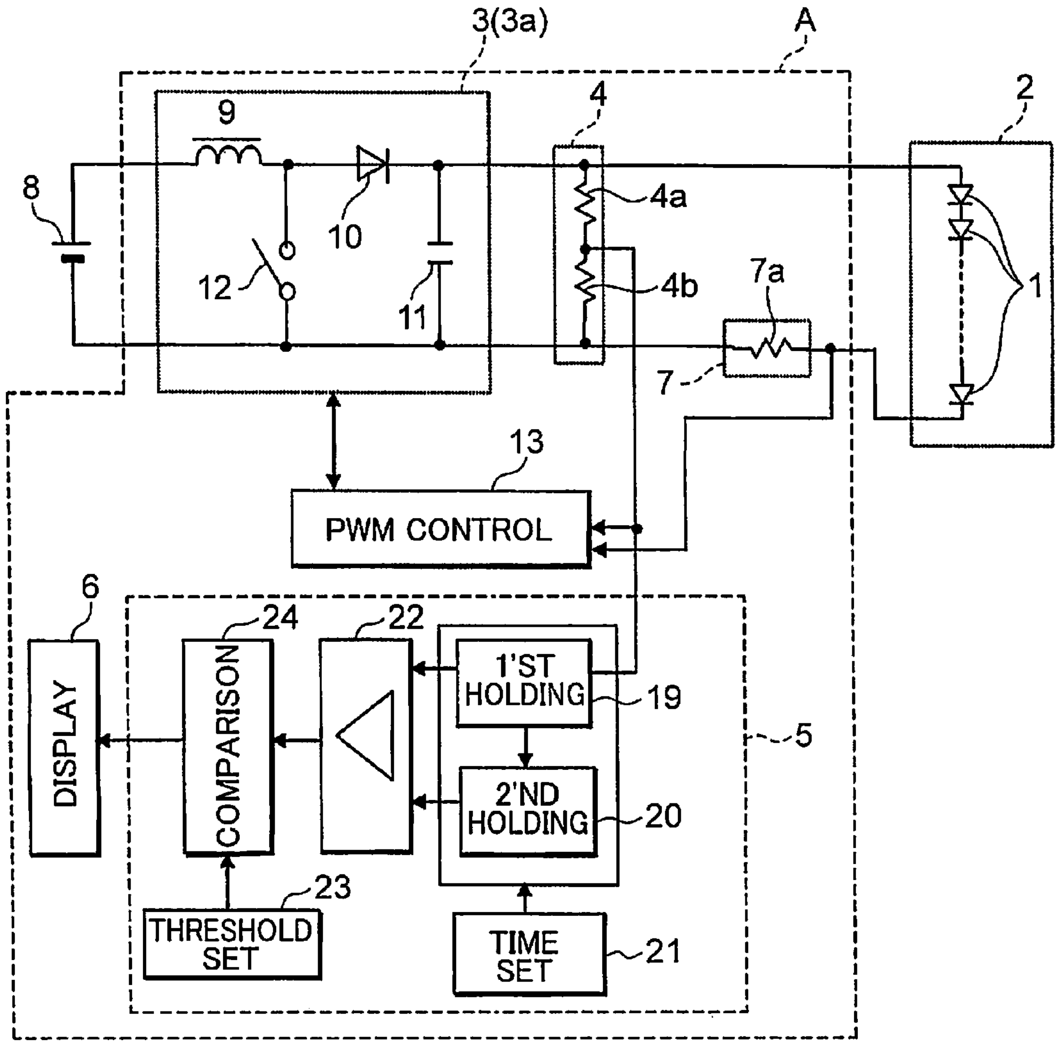
FIG. 2 shows a circuit configuration of the light emitting diode drive device according to the first embodiment of the present invention.

Next, a configuration and operations of the drive circuit section 3 are described with reference to FIG. 2. FIG. 2 shows a simplified portion regarding PWM control.

In the present embodiment, the drive circuit section 3 is a booster converter 3*a* which is a step-up type switching power supply circuit. The booster converter 3*a* serving as the drive circuit section 3 boosts a direct-current voltage from the power supply 8 to output a required voltage, and then supplies the voltage to the light source 2.

The booster converter 3*a* includes an inductor 9 having a first end connected to a high-voltage side of the power supply 8, a backflow prevention diode 10 having an anode connected to a second end of the inductor 9, a capacitor 11 connected between a cathode side of the diode 10 and a low-voltage side of the power supply 8, and a switch element 12 connected between the anode side of the diode 10 and the low-voltage side of the power supply 8. Examples of the switch element 12 may include a power MOSFET (Metal Oxide Semiconductor Field Effect Transistor) and the like.

The capacitor 11 is electrically charged when the switch element 12 is turned off while the inductor 9 receives electric current when the switch element 12 is turned on. Herein, the electric current flowing through the inductor 9 increases because of self induction as a time elapses. When the switch element 12 is turned off again, no electric current flows through the inductor 9 and a magnetic flux formed by the electric current in the inductor 9 decreases, so that there occurs a change in magnetic flux. Accordingly, an inverted electromotive force is generated in a direction that the change in magnetic force is prevented, that is, a direction that an electric current is continuously fed to the inductor 9. The voltage across the capacitor 11 (the output voltage) is generated in such a manner that a voltage based on the inverted electromotive force generated in the inductor 9 is superimposed on a voltage based on the electrical charge in the capacitor 11 in the state in which the switch element 12 is turned off. As a result, the resultant voltage is equal to or more than the voltage at the power supply 8. By use of this voltage, the switch element 12 is turned on and off periodically to boost the voltage.

The magnitude of the inverted electromotive force generated at the inductor 9 depends on the magnitude of the formed magnetic flux, and therefore the inverted electromotive force becomes large as the electric current flowing through the inductor 9 is large. Moreover, since the electric current increases as a time elapses, the magnitude of the output direct-current voltage becomes high as the ON period of the switch element 12 is long. A change in ratio between the ON period and the OFF period of the switch element 12 in one cycle allows a change in magnitude of the direct-current voltage to be output from the booster converter 3*a*.

Typically, control for changing a ratio between an ON period and an OFF period of a switch element in one cycle is referred to as duty control. Moreover, a method for controlling an output from a converter or the like in accordance with the duty control is referred to as PWM (Pulse Width Modulation) control.

In the present embodiment, the output from the booster converter 3*a* is controlled using this PWM control, so that the electric power to be supplied to the light source 2 is set suitable for light emission from the light source 2 and is kept at a certain level. When the electric power to be supplied to the light source 2 is kept at a certain level, the intensity of light emitted from the light emitting diode 1 becomes stable. Thus, it is possible to determine whether the light emitting diode 1, which lights up, is short-circuited, with stable accuracy.

Figure 3:
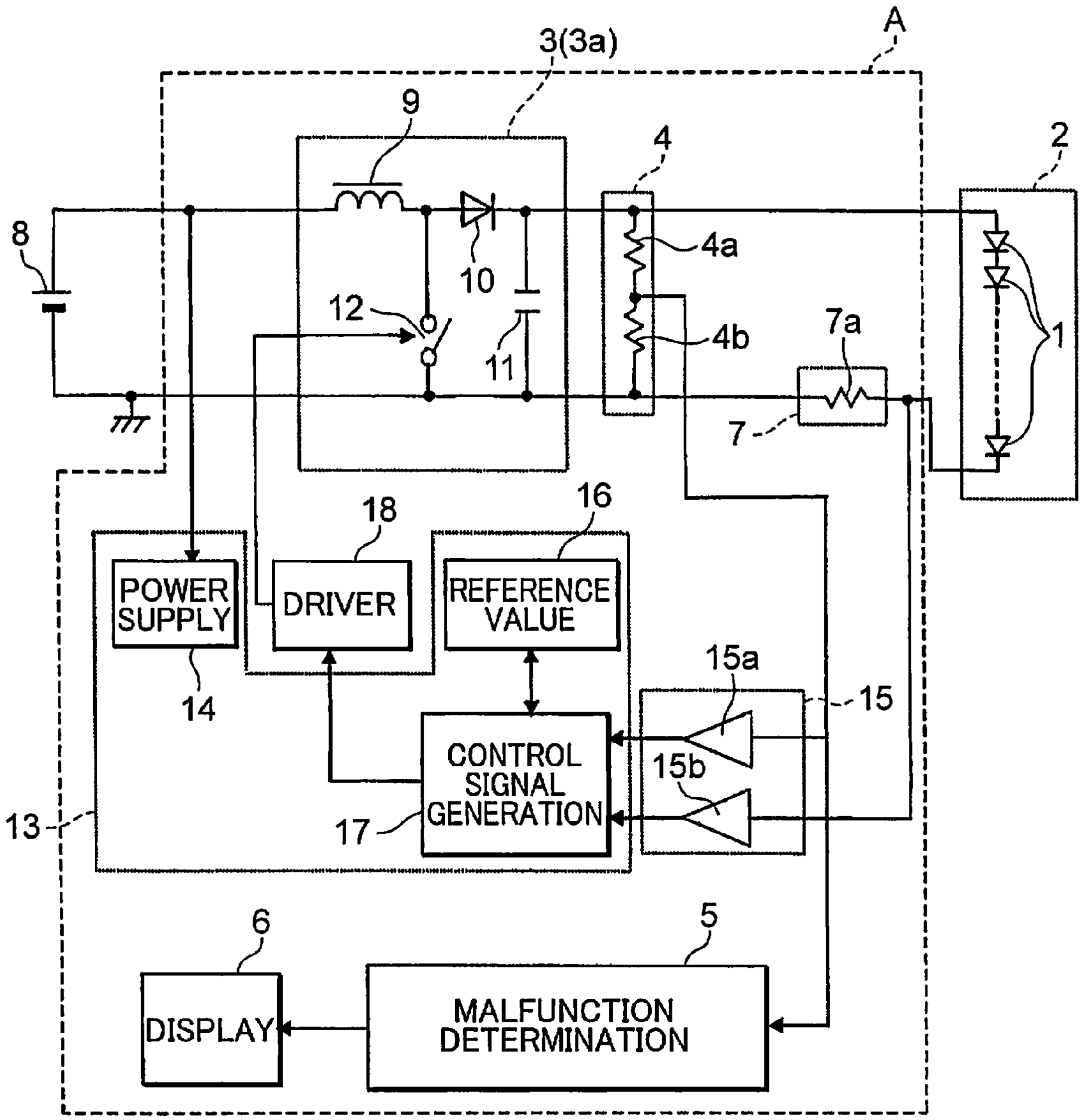
FIG. 3 shows a circuit configuration of the light emitting diode drive device according to the first embodiment of the present invention.

FIG. 3 shows details of the PWM control which is shown in FIG. 2 in a simplified manner. The PWM control is described with reference to FIG. 3.

In order to perform the PWM control, the booster converter 3*a* includes a PWM control circuit section 13 and a driver circuit section 18. The PWM control circuit section 13 includes a power supply circuit section 14, a reference value generation circuit section 16 and a PWM control signal generation circuit section 17.

The power supply circuit section 14 receives the electric power from the power supply 8 to generate an operating power supply voltage for the PWM control circuit section 13, and drives the PWM control circuit section 13. An amplification circuit section 15 includes a divided voltage amplifier 15*a* and a signal voltage amplifier 15*b*. The amplification circuit section 15 amplifies a divided voltage to output an amplified divided voltage, and also amplifies a signal voltage to output an amplified signal voltage. The amplified divided voltage is input to the reference value generation circuit section 16 through the PWM control signal generation circuit section 17. The reference value generation circuit section 16 divides a target electric power value set therein by the amplified divided voltage to set a target electric current to be fed to the light source 2, and generates a reference voltage corresponding to the set target electric current. The PWM control signal generation circuit section 17 compares the amplified signal voltage with a reference voltage, and generates a PWM control signal corresponding to the difference between the amplified signal voltage and the reference voltage. A driver circuit section 18 receives the PWM control signal to output a drive signal for controlling the ON/OFF state of the switch element 12 of the booster converter 3*a*. The booster converter 3*a* is subjected to the PWM control, based on this drive signal, and the output therefrom is kept at a certain level.

Next, operations of the malfunction determination circuit section 5 for determining the short circuit of the light emitting diode 1 are described with reference to FIG. 2 and FIG. 4.

The malfunction determination circuit section 5 includes a first holding section 19 that holds a divided voltage of the voltage across the light source 2 (herein, the divided voltage is detected by the voltage detection circuit section 4) every predetermined sampling time T, a second holding section 20 that holds the divided voltage held by the first holding section 19 before the first holding section 19 holds a new divided voltage (i.e., a divided voltage acquired at a preceding sampling timing), a time setting circuit section 21 that sets the sampling time T, a differential circuit section 22 that outputs a differential value between the voltage held by the first holding section 19 and the voltage held by the second holding section 20, a threshold value setting circuit section 23 that sets a threshold value for determining whether or not the output from the differential circuit section 22 is adequate to a short circuit of the light emitting diode 1, and a comparison circuit section 24 that compares the output from the differential circuit section 22 with the threshold value to determine whether or not the light emitting diode 1 is short-circuited.

Figure 4:
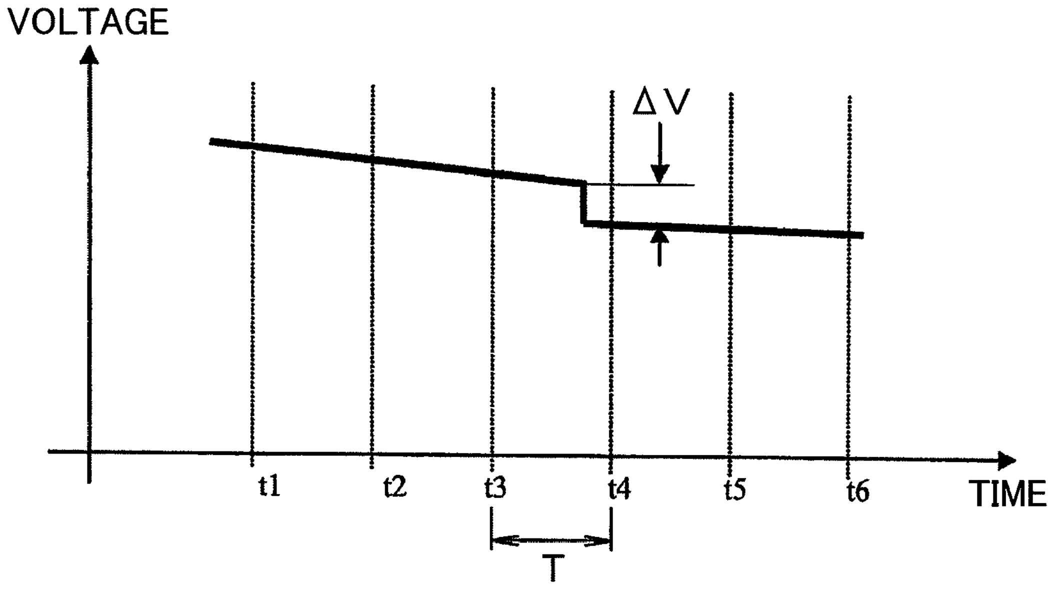
FIG. 4 shows a graph of a correlation between a detected voltage and a time in the light emitting diode drive device according to the first embodiment of the present invention.

In FIG. 4, a lateral axis indicates a time, in which "t1", "t2", . . . and "t6" each represent a timing that the first holding section 19 holds a divided voltage detected by the voltage detection circuit section 4. On the other hand, a vertical axis indicates a voltage, in which "ΔV" represents a value of drop of the voltage across the light source 2 in a case where one light emitting diode 1 is short-circuited.

The case where the detected divided voltage is held at the timing t3 and the timing t4 is described. The divided voltage detected by the voltage detection circuit section 4 is held by the first holding section 19 at the timing t3. After a lapse of the sampling time T set by the time setting circuit section 21, in other words, at the timing t4, the divided voltage, which is detected at the timing t3 and is held by the first holding section 19, is transferred to the second holding section 20 and is held by the second holding section 20. Thereafter, the divided voltage, which is detected at the timing t4, is held by the first holding section 19. Herein, the differential circuit section 22 outputs a differential value between the divided voltage held by the first holding section 19 and the divided voltage held by the second holding section 20. The comparison circuit section 24 compares the threshold value with the output from the differential circuit section 22, and when the output from the differential circuit section 22 is equal to or more than the threshold value, determines that the light emitting diode 1 is short-circuited.

When the light emitting diode 1, which lights up, is short-circuited, the voltage across the light source 2 is changed by an amount corresponding to a forward voltage at the short-circuited light emitting diode 1. Therefore, the threshold value is set with the forward voltage at one light emitting diode 1 used as a reference. However, the change of the voltage across the light source 2 because of the short circuit of the light emitting diode 1 depends on variations in characteristics of the light emitting diodes 1 in the process of manufacture, variations in voltage output from the power supply 8, and a secular change of the light emitting diode 1 caused by an ambient temperature and a light emitting operation. Accordingly, these factors occasionally lower accuracy of determining whether the light emitting diode 1, which lights up, is short-circuited. In order to prevent this disadvantage, the threshold value can be changed by the threshold value setting circuit section 23. For example, the threshold value setting circuit section 23 can change the threshold value, based on an external input signal. Alternatively, the light emitting diode drive device A may be provided with a knob for changing the settings, and this knob may be operated for changing the threshold value.

Moreover, the length of the sampling time T also exerts an adverse influence on the accuracy of determination about the short circuit, and therefore can be changed by the time setting circuit section 21. As in the case of the threshold value, for example, the time setting circuit section 21 can change the sampling time T, based on an external input signal. Alternatively, the light emitting diode drive device A may be provided with a knob for changing the settings, and this knob may be turned for changing the sampling time T.

Next, operations of the malfunction determination circuit section 5 after determining that the light emitting diode 1 is short-circuited or is not short-circuited will be described.

The result of determination by the malfunction determination circuit section 5, that is, the fact that the light emitting diode 1 is short-circuited or is not short-circuited is stored in a memory circuit section 40 (see FIG. 1) which is a nonvolatile memory circuit, for example. The display section 6 receives the result from the memory circuit section 40, and displays the fact that the light emitting diode 1 is short-circuited or is not short-circuited. The display section 6 is provided on a panel display section in an operating seat. Thus, a user can readily check the fact that the light emitting diode 1 is short-circuited or is not short-circuited, and when the light emitting diode 1 is short-circuited, the display section 6 prompts the user to repair the short-circuited light emitting diode 1.

In accordance with the fact that the light emitting diode 1 is short-circuited or is not short-circuited, which is stored in the memory circuit section 40, the electric power to be supplied to the light source 2 is restricted upon emission of light again. More specifically, in order to drive the light emitting diode drive device A, the PWM control signal generation circuit section 17 determines whether or not the memory circuit section 40 stores therein the fact that the light emitting diode 1 is short-circuited. When the memory circuit section 40 stores therein the fact that the light emitting diode 1 is short-circuited, the PWM control signal generation circuit section 17 turns the switch element 12 off, for example. Thus, since no voltage is boosted by the drive circuit section 3, no electric power is supplied to the light source 2. This configuration makes it possible to prevent continuous use of the light source 2 with a reduced quantity of light.

The output voltage from the power supply 8 is set at a voltage having a value obtained by multiplying a numeric value which is smaller by one than the number of light emitting diodes 1 in the light source 2 by a value of a forward ON voltage at the light emitting diode 1, that is, a voltage which is lower than a threshold voltage required for allowing the light source 2 to light up in a state in which one of the light emitting diodes 1 is short-circuited.

In the present embodiment, the power supply 8 is a battery for outputting a direct-current voltage; however, the present invention is not limited thereto. Alternatively, the power supply 8 may include an alternating-current power supply 8*a*. With this configuration, the PWM control signal generation circuit section 17 turns the switch element 12 off to lower the voltage to be applied to the light source 2 to a level below the threshold voltage, so that the light source 2 is turned out.

Figure 5:
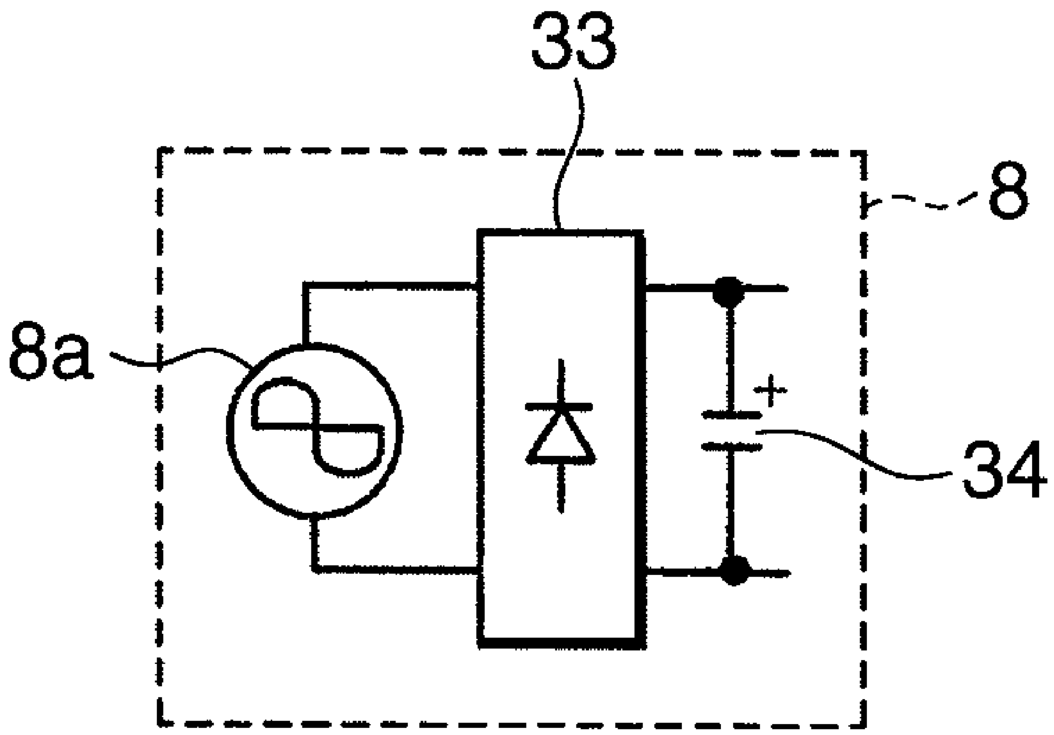
FIG. 5 shows a schematic circuit configuration of a power supply in the first embodiment of the present invention.

As shown in FIG. 5, the power supply 8 including the alternating-current power supply 8*a* also includes a rectifying diode 33 that rectifies an alternating current, and a smoothing capacitor 34 that smoothes the electric current rectified by the rectifying diode 33. Herein, two ends of the smoothing capacitor 34 serve as output terminals of the power supply 8.

Second Embodiment

Figure 6:
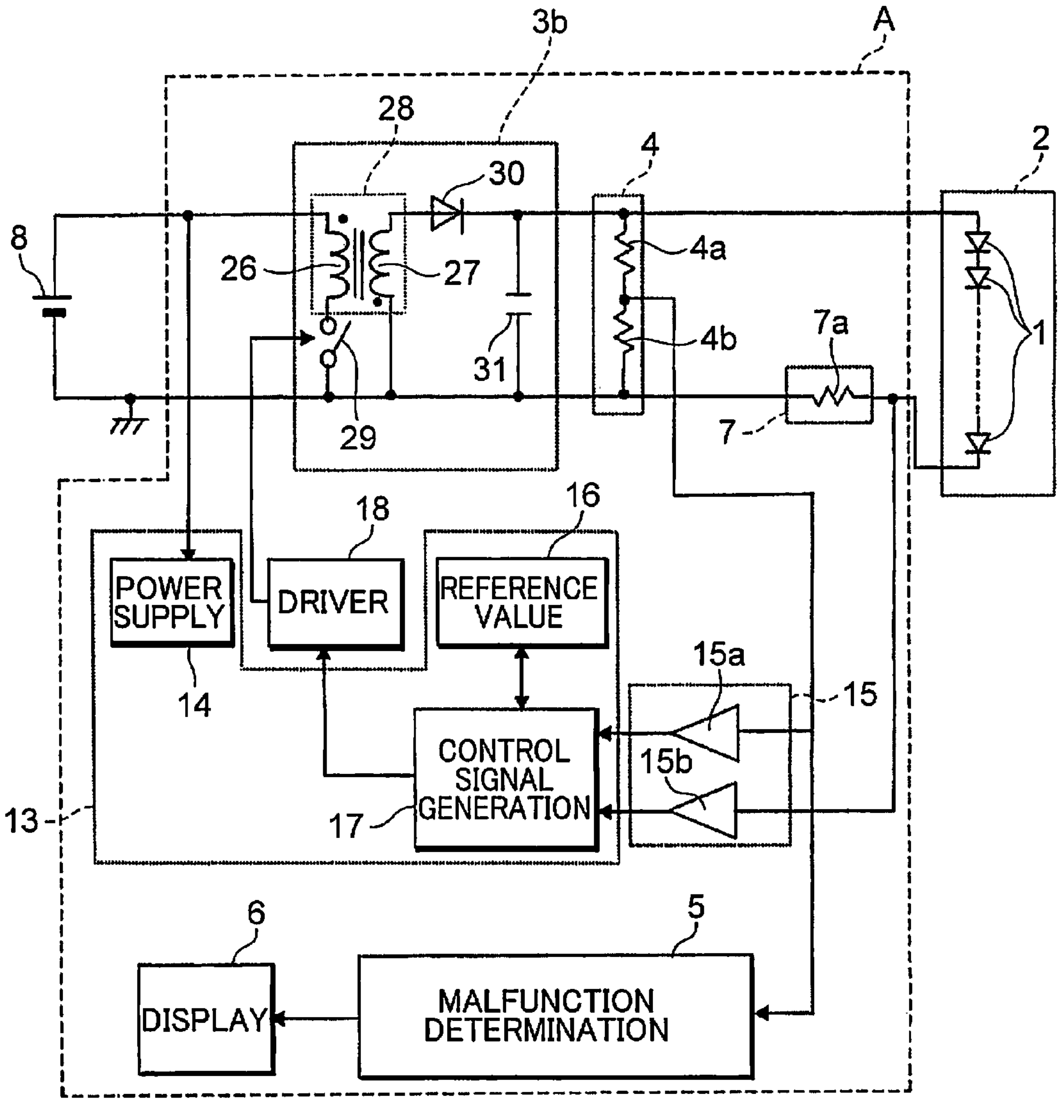
FIG. 6 shows a circuit configuration of a light emitting diode drive device according to a second embodiment of the present invention.

As shown in FIG. 6, a light emitting diode drive device A according to the present embodiment is different from the light emitting diode drive device A according to the first embodiment in a point that a flyback converter 3*b* including a flyback transformer 28 is provided in place of the drive circuit section 3. In the present embodiment, the remaining configuration is similar to that described in the first embodiment. In the present embodiment, constituent members identical with those in the first embodiment are denoted with the identical reference signs, and therefore the description thereof will not be given.

A configuration and operations of the flyback converter 3*b* are described herein below with reference to FIG. 6.

The flyback converter 3*b* includes a flyback transformer 28 that includes a power supply-side wire 26 wound around a core (not shown) with a first end thereof connected to a high pressure side of a power supply 8 which is a direct-current power supply and a output-side wire 27 coupled magnetically to the power supply-side wire 26 and wound around a core (not shown) in a direction opposite to that of the power supply-side wire 26, a flyback switch element 29 connected to a second end of the power supply-side wire 26 and a low pressure side of the power supply 8, a backflow preventing flyback diode 30 having an anode connected to a first end of the output-side wire 27, and a flyback capacitor 31 connected to a cathode of the flyback diode 30 and a second end of the output-side wire 27. Herein, two ends of the flyback capacitor 31 serve as output terminals of the flyback converter 3*b*. Examples of the flyback switch element 29 may include a power MOSFET and the like.

During a period of time that the flyback switch element 29 is turned on, an electric current flows through the power supply-side wire 26. The electric current flowing through the power supply-side wire 26 increases because of self induction as a time elapses. Herein, an electromotive force is generated at the output-side wire 27 because of mutual induction, but is directed inversely since the output-side wire 27 is wound inversely with respect to the power supply-side wire 26. Accordingly, the flyback diode 30 prevents the electric current from flowing through the output-side wire 27. Next, the flyback switch element 29 is turned off. When the flyback switch element 29 is turned off, a magnetic flux formed on the power supply-side wire 26 decreases. Herein, the electromotive force is generated because of the mutual induction at the output-side wire 27. This electromotive force serves as an output from the flyback converter 3*b*. In other words, when the flyback switch element 29 is turned on, a magnetic force is accumulated in the power supply-side wire 26. On the other hand, when the flyback switch element 29 is turned off, the magnetic force is released from the output-side wire 27. Thus, a voltage is generated at the output-side wire 27.

As described above, the electric current flowing through the power supply-side wire 26 increases as the time elapses. For this reason, the magnetic force to be accumulated in the power supply-side wire 26 becomes strong as the ON period of the flyback switch element 29 is long, so that the output voltage becomes high. As in the case of the booster converter 3*a*, it is possible to control an output from the flyback converter 3*b* in such a manner that the flyback converter 3*b* is subjected to PWM control by control of a duty ratio.

In the present embodiment, the output voltage of the flyback converter 3*b* is controlled by a PWM control circuit section which is similar to that described in the first embodiment, so that electric power to be supplied to a light source 2 is set at a predetermined level and is kept constantly.

Moreover, the voltage generated by the magnetic force released from the output-side wire 27 depends on a ratio regarding inductance between the power supply-side wire 26 and the output-side wire 27 and a duty ratio between an ON state and an OFF state of the flyback switch element 29. Therefore, the change in inductance ratio and duty ratio allows the flyback converter 3*b* to boost and lower a voltage. Accordingly, it is possible to realize a drive circuit section 3 irrespective of a direct-current voltage to be output from the direct-current power supply 8*a*.

Third Embodiment

Figure 7:
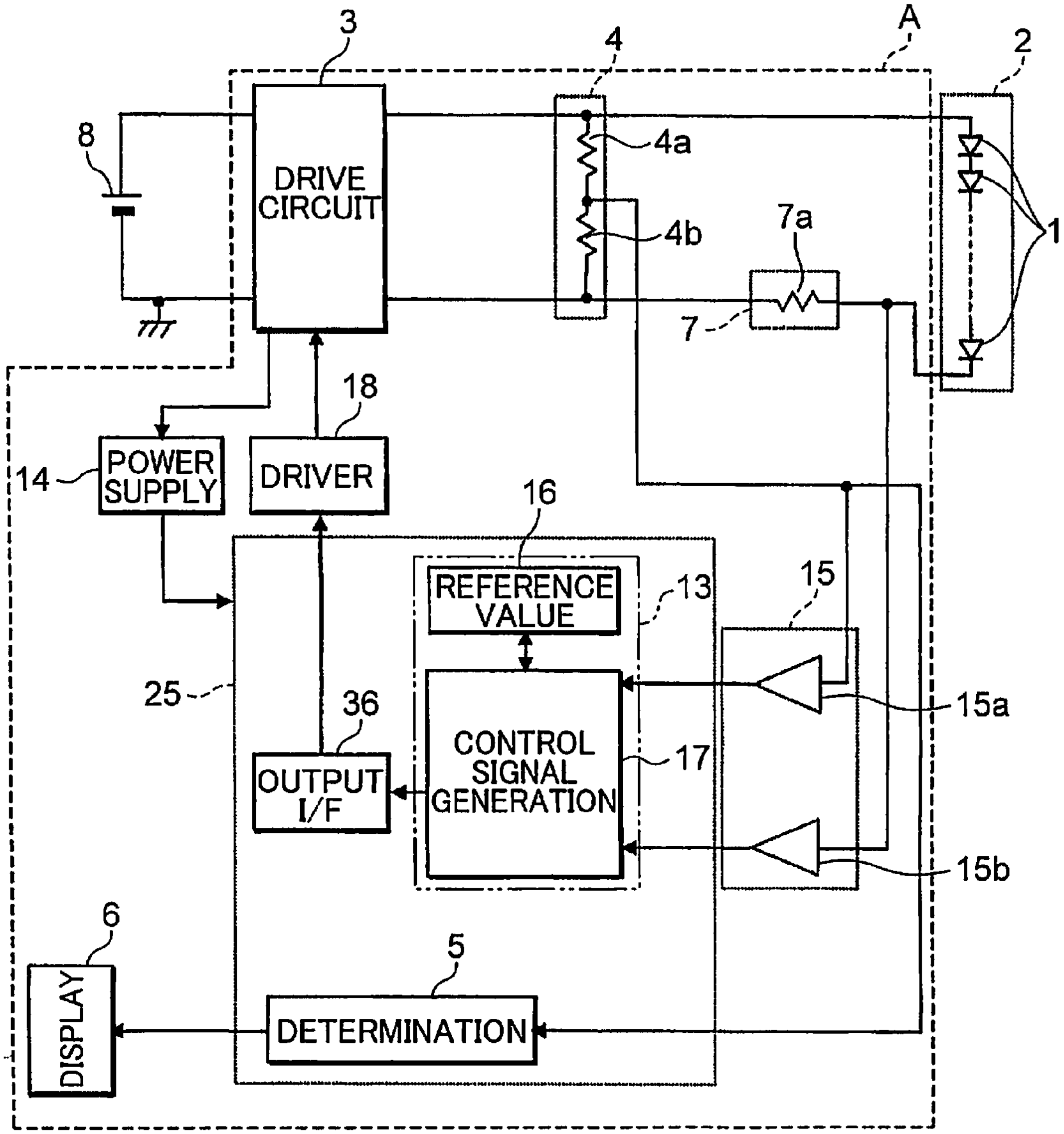
FIG. 7 shows a circuit configuration of a light emitting diode drive device according to a third embodiment of the present invention.
Figure 8:
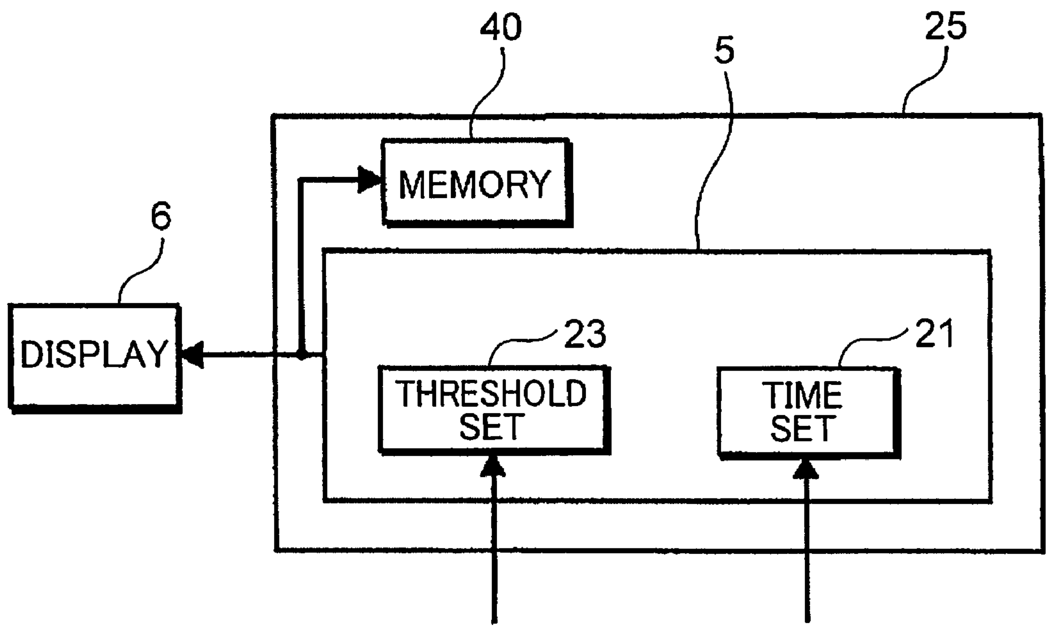
FIG. 8 shows a block diagram of a malfunction determination circuit section in the light emitting diode drive device according to the third embodiment of the present invention.
Figure 9:
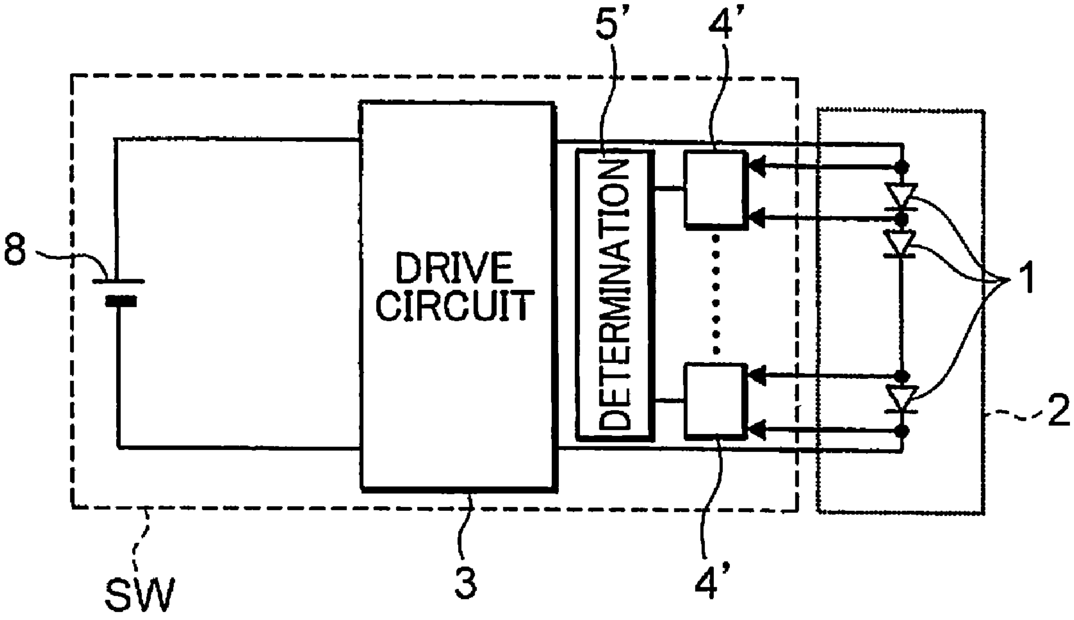
PRIOR ART FIG.9
FIG. 9 shows a schematic circuit configuration of a conventional light emitting diode drive device.

As shown in FIG. 7 and FIG. 8, a light emitting diode drive device according to the present embodiment is different from the light emitting diode drive device according to the first embodiment in points that a microcomputer 25 includes a PWM control circuit section 13, a malfunction determination circuit section 5 and a memory circuit section 40 and the memory circuit section 40 is a flash memory. In the present embodiment, the remaining configuration is similar to that described in the first or second embodiment. In the present embodiment, constituent members identical with those in the first or second embodiment are denoted with the identical reference signs, and therefore the description thereof will not be given.

The microcomputer 25 includes an output interface 36. A PWM control signal is generated by a PWM control signal generation circuit section 17 of the PWM control circuit section 13, and is output to a driver control section 18 via the output interface 36.

The PWM control circuit section 13 configured with the microcomputer 25 can set the generation of the PWM control signal more finely, and can finely adjust electric power to be supplied to a light source 2 such that the electric power becomes stable at a certain level. Simultaneously, the malfunction determination circuit section 5 configured with the microcomputer 25 can be obtained at low cost. As described above, it is desirable that the microcomputer 25 includes at least the PWM control circuit section 13 and the malfunction determination circuit section 5.

Further, it is more desirable that the microcomputer 25 also includes the memory circuit section 40 because a circuit configuration can be simplified. In particular, the memory circuit section 40, which is in a form of flash memory, can hold data with ease even in a case where no electric power is supplied thereto from a power supply circuit section 14. Further, the memory circuit section 40, which is in the form of flash memory, allows rewrite of the data stored therein.

The light emitting diode drive device A according to each embodiment is accommodated together with the light source 2 in an apparatus main body (not shown) which is configured appropriately, so that an illumination device can be realized.

Alternatively, the light emitting diode drive device A according to each embodiment is accommodated together with the light source 2 in an in-vehicle light body (not shown). As a result, the light emitting diode drive device A may be used as an in-vehicle cabin illumination device to be installed in an interior of a vehicle, or may be used as a vehicle illumination device (e.g., a headlight, an auxiliary lamp, a daytime running lamp) to be attached to a vehicle body.

As described above, according to one aspect of the present invention, there is provided a light emitting diode drive device including a drive circuit section that applies a direct-current voltage to a light source including a plurality of light emitting diodes connected in series to allow the light source to light up, a voltage detection circuit section that detects a voltage across the light source, and a malfunction determination circuit section that determines that the light emitting diode is short-circuited when the voltage detection circuit section detects a voltage drop and a potential between the voltage before being dropped and the voltage after being dropped is equal to or more than a predetermined threshold value.

With this configuration, the light emitting diode drive device determines whether or not the light emitting diode, which lights up, is short-circuited, based on the change in voltage across the light source. Therefore, the light emitting diode drive device is simpler in circuit configuration than a conventional light emitting diode drive device that detects voltages at a plurality of light emitting diodes. Accordingly, it is possible to provide a light emitting diode drive device which is manufactured with smaller manufacturing steps at lower manufacturing cost as compared with a conventional light emitting diode drive device for detecting voltages at a plurality of light emitting diodes.

In the configuration described above, the light emitting diode drive device further includes a display section that displays the fact that the light emitting diode is short-circuited or is not short-circuited, which is determined by the malfunction determination circuit section.

With this configuration, a user of the light emitting diode drive device can view the fact that the light emitting diode is short-circuited or is not short-circuited, through the display section. For this reason, the light emitting diode drive device can prompt the user to repair the light emitting diode. This configuration improves the convenience for the user.

In the configuration described above, the light emitting diode drive device further includes a memory circuit section that stores therein the fact that the light emitting diode is short-circuited or is not short-circuited, which is determined by the malfunction determination circuit section.

With this configuration, the memory circuit section stores therein the fact that the light emitting diode is short-circuited or is not short-circuited. Therefore, in a case where the light emitting diode drive device, which is halted, is used again, the user can check the fact that the light emitting diode is short-circuited or is not short-circuited, which is stored in the memory circuit section, before a direct-current voltage is applied to the light source. Accordingly, in the case where the light emitting diode drive device, which is halted, is used again, the user can check whether or not the light source is in a usable state. The light emitting diode drive device can select an operation in accordance with the state of the light source.

In the configuration described above, the drive circuit section checks data stored in the memory circuit section prior to the application of the direct-current voltage to the light source, and when the memory circuit section stores therein the result of determination that the light emitting diode is short-circuited, lowers the voltage to be applied to the light source to a level below a threshold voltage required for light emission from the light source.

With this configuration, in the case where the light emitting diode drive device, which is halted, is used again, if the memory circuit section stores therein the result of determination that the light emitting diode is short-circuited, the voltage to be applied to the light source is lowered to a level below the threshold voltage for light emission from the light source. Therefore, it is possible to prevent continuous use of the light source in a state in which a quantity of light is reduced.

In the configuration described above, the malfunction determination circuit section includes a first holding section that holds a voltage detected by the voltage detection circuit section every predetermined sampling time, a second holding section that holds the voltage held by the first holding section before the first holding section holds a new voltage, a differential circuit section that outputs a potential difference between the voltage held by the first holding section and the voltage held by the second holding section, and a comparison circuit section that determines that the light emitting diode is short-circuited, when the output from the differential circuit section is equal to or more than the threshold value.

With this configuration, it is determined whether or not the light emitting diode, which lights up, is short-circuited, based on whether or not the change of the voltage across the light source at the predetermined sampling time is equal to or more than the threshold value. Therefore, it is possible to distinguish a voltage variation within a normal range from a voltage drop due to a short circuit of a light emitting diode. Accordingly, it is possible to determine whether or not the light emitting diode, which lights up, is short-circuited with improved accuracy.

In the configuration described above, at least one of the sampling time and the threshold value is changeable.

With this configuration, at least one of the sampling time and the threshold value is changeable. Therefore, it is possible to set a sampling time and a threshold value each capable of distinguishing a voltage variation within a normal range from a malfunction such as a short circuit of a light emitting diode. Herein, the voltage variation occurs in accordance with characteristics of the light emitting diodes, characteristics of the power supply for supplying electric power to the drive circuit section, a secular change of the light emitting diode because of an ambient temperature and a light emitting operation, and the like. Accordingly, it is possible to determine whether the light emitting diode, which lights up, is short-circuited with stable accuracy.

In the configuration described above, at least one of the sampling time and the threshold value can be changed based on an external input signal.

With this configuration, at least one of the sampling time and the threshold value can be changed using an external input signal. Therefore, it is possible to externally set a sampling time and a threshold value each capable of distinguishing a voltage variation within a normal range from a malfunction such as a short circuit of a light emitting diode. Herein, the voltage variation occurs in accordance with characteristics of the light emitting diodes, characteristics of the power supply for supplying electric power to the drive circuit section, a secular change of the light emitting diode because of an ambient temperature and a light emitting operation, and the like. Accordingly, it is possible to determine whether the light emitting diode, which lights up, is short-circuited with stable accuracy.

In the configuration described above, the drive circuit section is a flyback converter that converts a direct-current voltage to be input thereto into a predetermined direct-current voltage, and outputs the direct-current voltage.

With this configuration, the flyback converter serves as the drive circuit section. Therefore, it is possible to apply, to the light source, a direct-current voltage suitable for light emission from the light emitting diode by the drive circuit section even when a voltage at the power supply for supplying electric power to the light emitting diode drive device is different from a voltage for light emission from the light source.

In the configuration described above, the drive circuit section is a step-up chopper type booster converter that boosts a direct-current voltage to be input thereto and outputs a predetermined direct-current voltage.

With this configuration, the step-up chopper type booster converter for boosting a direct-current voltage to a predetermined level serves as the drive circuit section. Therefore, it is possible to boost a direct-current voltage to a level suitable for light emission from the light source by the drive circuit section and then to apply the boosted voltage to the light emitting diode even when a voltage at the power supply for supplying electric power to the light emitting diode drive device is lower than a voltage for light emission from the light source.

In the configuration described above, the light emitting diode drive device further includes a current detection circuit section that detects an electric current to be fed to the light source, and a PWM control circuit section that has a reference value generation circuit section for setting a target electric current to be fed to the light source, based on the voltage detected by the voltage detection circuit section and a preset value of electric power. Herein, the PWM control circuit section controls the drive circuit section in a PWM manner such that the electric current detected by the current detection circuit section matches with the target electric current.

With this configuration, it is possible to supply a desired amount of electric power to the light source and to keep the supplied electric power at a certain level. Accordingly, it is possible to keep a quantity of light from the light emitting diode at a desired level. Moreover, it is possible to determine whether or not the light emitting diode, which lights up, is short-circuited, with stable accuracy since the electric power is supplied stably.

In the configuration described above, at least the PWM control circuit section and the malfunction determination circuit section are configured with a microcomputer.

With this configuration, the PWM control circuit section is configured with the microcomputer. Therefore, it is possible to finely adjust a PWM control signal and to control electric power to be output from the drive circuit section, with good accuracy.

Moreover, it is possible to reduce a parts count since both the PWM control circuit section and the malfunction determination circuit section are configured with the microcomputer.

In the configuration described above, the microcomputer includes the memory circuit section.

With this configuration, the memory circuit section is also configured with the microcomputer. Therefore, it is possible to simplify the circuit configuration.

In the configuration described above, the memory circuit section is a flash memory.

With this configuration, the flash memory serves as the memory circuit section. Therefore, it is possible to hold data even when no electric power is supplied to the light emitting diode drive device, and to readily rewrite the data.

According to another aspect of the present invention, there is provided an illumination device including the light emitting diode drive device having any one of the configurations described above, and the light source.

With this configuration, the illumination device employs the light emitting diode drive device described above, and therefore can be realized with a simple circuit configuration at low cost.

According to still another aspect of the present invention, there is provided an in-vehicle cabin illumination device including the light emitting diode drive device having any one of the configurations described above, and the light source.

With this configuration, the in-vehicle cabin illumination device employs the light emitting diode drive device described above, and therefore can be realized with a simple circuit configuration at low cost.

According to yet another aspect of the present invention, there is provided a vehicle illumination device including the light emitting diode drive device having any one of the configurations described above, and the light source.

With this configuration, the vehicle illumination device (e.g., a headlight, an auxiliary lamp, a daytime running lamp) employs the light emitting diode drive device described above, and therefore can be realized with a simple circuit configuration at low cost.

The invention claimed is:

1. A light emitting diode drive device, comprising:

a drive circuit section that applies a direct-current voltage to a light source including a plurality of light emitting diodes connected in series to allow the light source to light up;

a voltage detection circuit section that detects a voltage across the light source; and a malfunction determination circuit section that determines that the light emitting diode is short-circuited when the voltage detection circuit section detects a voltage drop and a difference between the voltage before being dropped and the voltage after being dropped is equal to or more than a predetermined threshold value that is an amount corresponding to a voltage of at least one of the plurality of light emitting diodes, wherein the malfunction determination circuit section includes:

a first holding section that holds a voltage detected by the voltage detection circuit section every predetermined sampling time;

a second holding section that holds the voltage held by the first holding section before the first holding section holds a new voltage;

a differential circuit section that outputs a potential difference between the voltage held by the first holding section and the voltage held by the second holding section; and a comparison circuit section that determines that the light emitting diode is short-circuited, when the output from the differential circuit section is equal to or more than the threshold value.

2. The light emitting diode drive device according to claim 1, further comprising:

a display section that displays the fact that the light emitting diode is short-circuited or is not short-circuited, which is determined by the malfunction determination circuit section.

3. The light emitting diode drive device according to claim 1, further comprising:

a memory circuit section that stores therein the fact that the light emitting diode is short-circuited or is not short-circuited, which is determined by the malfunction determination circuit section.

4. The light emitting diode drive device according to claim 3, wherein:

the drive circuit section checks data stored in the memory circuit section prior to the application of the direct-current voltage to the light source, and when the memory circuit section stores therein the result of determination that the light emitting diode is short-circuited, lowers the voltage to be applied to the light source to a level below a threshold voltage required for light emission from the light source.

5. The light emitting diode drive device according to claim 1, wherein:

at least one of the sampling time and the threshold value is changeable.

6. The light emitting diode drive device according to claim 1, wherein:

at least one of the sampling time and the threshold value can be changed based on an external input signal.

7. The light emitting diode drive device according to claim 1, wherein:

the drive circuit section is a flyback converter that converts a direct-current voltage to be input thereto into a predetermined direct-current voltage, and outputs the direct-current voltage.

8. The light emitting diode drive device according to claim 7, further comprising:

a current detection circuit section that detects an electric current to be fed to the light source; and a PWM control circuit section that has a reference value generation circuit section for setting a target electric current to be fed to the light source, based on the voltage detected by the voltage detection circuit section and a preset value of electric power, wherein:

the PWM control circuit section controls the drive circuit section in a PWM manner such that the electric current detected by the current detection circuit section matches with the target electric current.

9. The light emitting diode drive device according to claim 8, wherein:

at least the PWM control circuit section and the malfunction determination circuit section are configured with a microcomputer.

10. The light emitting diode drive device according to claim 9, further comprising a memory circuit section that stores therein the fact that the light emitting diode is short-circuited or is not short-circuited, which is determined by the malfunction determination circuit section, wherein:

the microcomputer includes the memory circuit section.

11. The light emitting diode drive device according to claim 10, wherein:

the memory circuit section is a flash memory.

12. The light emitting diode drive device according to claim 1, wherein:

the drive circuit section is a step-up chopper type booster converter that boosts a direct-current voltage to be input thereto and outputs a predetermined direct-current voltage.

13. An illumination device, comprising:

the light emitting diode drive device according to claim 1, and the light source.

14. An in-vehicle cabin illumination device, comprising:

the light emitting diode drive device according to claim 1, and the light source.

15. A vehicle illumination device, comprising:

the light emitting diode drive device according to claim 1, and the light source.

* * * * *